United States Patent [19]
Erdmann

[11] 3,955,231
[45] May 11, 1976

[54] CUP NUT MASS PRODUCTION PROCESS

[76] Inventor: Heinz W. Erdmann, Hauptstrasse 51a, 5984 Garbeck, Germany

[22] Filed: Sept. 18, 1974

[21] Appl. No.: 507,066

Related U.S. Application Data

[63] Continuation-in-part of Ser. No. 311,733, Dec. 7, 1972, abandoned.

[30] Foreign Application Priority Data

Dec. 14, 1971 Germany............................ 2161790

[52] U.S. Cl.................................... 10/86 C; 85/35
[51] Int. Cl.²........................................ B21D 53/24
[58] Field of Search................. 10/86 C; 85/35; 151/41.7; 219/105, 107; 72/347, 348, 349

[56] References Cited
UNITED STATES PATENTS

| | | | |
|---|---|---|---|
| 2,183,563 | 12/1939 | Hart.................................. | 219/107 |
| 2,467,391 | 4/1949 | Kerr et al........................... | 219/107 |
| 2,931,888 | 4/1960 | Thome............................... | 219/107 |
| 3,029,507 | 4/1962 | Gaggini............................. | 72/348 |

FOREIGN PATENTS OR APPLICATIONS 739,405   10/1955   United Kingdom.................... 85/35

Primary Examiner—C. W. Lanham
Assistant Examiner—E. M. Combs
Attorney, Agent, or Firm—W. G. Fasse; W. W. Roberts

[57] ABSTRACT

The present process is especially suitable for economically producing cup nuts in large quantities by conventionally manufacturing the nuts and by deep drawing the cups separately from sheet metal in a single step to provide the cup with an outwardly facing chamfer along its edge surrounding the open end of the cup. In other words, the chamfer is produced as the result of the deep drawing step. The cup and the nut are connected by applying pressure and welding current whereby the pressure is applied just prior to, during and shortly after the welding to produce an intimate bond between the nut and cup. Due to the chamfer the welding bond forms an inwardly facing butt welding seam preferably running all around the edge of the cup, whereby a machining after the welding is avoided.

7 Claims, 2 Drawing Figures

CUP NUT MASS PRODUCTION PROCESS

BACKGROUND OF THE INVENTION

The present invention is a continuation-in-part application of my copending application Ser. No. 311,733 filed Dec. 7, 1972 for CUP NUT MASS PRODUCTION PROCESS, now abandoned.

The present invention relates to a mass production process for manufacturing so-called cup nuts. Such cup nuts are frequently used in mechanical construction in connection with parts in which the outwardly extending thread of a bolt is to be covered for protecting the thread against damage as well as for protecting people against injury by such protruding threaded bolt ends. In addition, the cup nuts provide a better appearance as compared to threaded bolt ends. Thus, such cup nuts are used, for example, as wheel nuts in motor vehicles, as protective nuts in machine tools or as decorative nuts on dash boards, switch boards, and the like.

Cup nuts made of steel, brass, or any other metal have been produced conventionally in several different fashions. One way of producing such cup nuts employs conventional automatic screw machines which produce the nuts from hexagonal stock, which is first drilled and countersunk whereupon the nut is provided with a thread and then turned to form, and severed from the longitudinal stock. This type of automatic production of cup nuts from solid stock is rather uneconomical, because only about 50% of the stock material is actually employed for the finished product. The remainder of the material is only reusable as scrap metal.

In view of the foregoing, it has been suggested heretofore to produce cup nuts from several parts in order to save material and in order to accomplish the production by simpler machine tools. Thus, German Utility Model No. 1,895,903 suggest providing the nut body of a two part cup nut with a ring groove into which is inserted the rim or edge of a cup produced from sheet metal, for example, by deep drawing. After the deep drawing, the rim of the cup is bent slightly outwardly for insertion of the rim into said groove. The connection is then established by pressing the outer margin of the nut body against the cup rim in the groove of the nut body. This type of construction requires the additional machining step of cutting the groove in the nut body. This additional machining step not only causes an additional loss of material, it also increases the costs. A further disadvantage is seen in that the cup may be easily pushed out of the groove of the nut, for example, when the threaded end of the bolt sticks out too far of the body of the nut proper, whereby this connection established merely by pressure or so called flanging may be opened and the cup nut may be damaged as a result thereof.

Similar disadvantages are also present in a cup nut produced from two separate parts according to German Utility Model No. 6,902,642. This prior art teaches to provide one element of the cup nut with a toroidal bead or ridge and to provide the other element of the cup nut with a respectively shaped groove, whereby the interconnection is accomplished by a type of snap-action resulting in a relatively rigid connection. In both instances of the just described prior art cup nuts, there remain visible seams which may be easily damaged whereby the cup may be separated from the nut.

British Pat. No. 739,405 discloses a method for the production of cup nuts, wherein circular disks are first punched out from sheet metal. Thereafter the disks are pressed or stamped into the required convex or hemispherical shape. Simultaneously with the second shaping step the cup is provided with an outwardly flaring flange which in addition may be provided with a downwardly facing ridge extending all around the flange. The flange is then welded to the nut proper. This technique has the drawback that the formation of the flange requires an extra work step and that the welding seam is not entirely unvisible.

It appears that the drawbacks of the above described three methods for manufacturing cup nuts from separate parts have somehow prevented the wide spread acceptance of such cup nuts.

It is also known, for example, from U.S. Pat. Nos. 2,183,563 (Hart) or 2,467,391 (Kerr et al.) to join tubular metal stock by first machining a pipe or tube end to provide it with a chamfer and to then produce a butt weld around the chamfer. Bicycle frames, for example, have been welded in this manner, whereby reasonably clean butt welds have been achieved. Tubular stock has also been joined in this fashion to a flange, however, the butt weld between the flange and the tubular stock remained visible.

OBJECTS OF THE INVENTION

In view of the foregoing, it is the aim of the invention, to achieve the following objects, singly or in combination:

to overcome the drawbacks of the prior art, more specifically to provide a process for producing a cup nut from two initially separate parts, which may be economically and securely connected to each other by resistance welding, without leaving a visible welding seam;

to provide a process for the mass production of cup nuts from two separate parts without the need for expensive and complicated production machinery;

to provide a cup nut which shall be at least equal in its characteristics, especially its strength characteristics to prior art cups, which have been produced as one piece units from hexagonal stock;

to produce cup nuts at a substantial saving of about 50% as compared to cup nuts produced heretofore on automatic screw machines from hexagonal stock;

to produce cup nuts by manufacturing the cups separately from sheet metal stock in a deep drawing step, which simultaneously produces a chamfer facing outwardly around the edge surrounding the open end of the cup; and to assure an inwardly facing butt welding seam in order to avoid any external machining of the finished product.

SUMMARY OF THE INVENTION

According to the invention there is provided a process for the mass production of cup nuts by welding together standard nuts, for example, normal hexagonal nuts, and cups deep drawn from sheet metal, whereby this deep drawing step provides the edge of the cup facing the nut with an outwardly facing bevel or chamfer. Pressure is applied to the cup and nut prior, during and shortly after the application of welding current. The outwardly facing chamfer in combination with the just mentioned application of pressure and welding current results in a one-sided inwardly facing corner butt welding seam, since the material is thereby caused to flow inwardly, so that a neat welding seam is formed which is not visible at all on the outside of the finished product, and thus obviates any further finishing work.

The main advantage of the invention is seen in that by using standard parts, such as standard nuts and simple deep drawn sheet metal cups, cup nuts may be produced without any special apparatus in a simple manner. The resulting cups are not distinguishable in their external appearance, as well as in their strength characteristics, from conventional cup nuts produced heretofore on automatic screw machines, whereby a saving of more than 50% has been realized according to the invention, as compared to the costs of cup nuts produced on automatic screw machines.

Another advantage of the invention is seen in that the individual steps of production do not require the care and precision which is required when producing integral structure cup nuts from hexagonal stock. According to the invention, the individual production of raw standard hexagonal nuts and the deep drawing of cup nuts from sheet metal, as well as the butt welding can be done on a mass production basis without the need for high precision work and without additional finishing work. The present invention is rather versatile since materials of any material strength especially of higher material strength, such as alloy steels may be easily handled in accordance with the present steps.

BRIEF FIGURE DESCRIPTION

In order that the invention may be clearly understood, it will now be described, by way of example, with reference to the accompanying drawings, wherein.

DETAILED DESCRIPTION OF EXAMPLE EMBODIMENTS

Figures 1, 2:
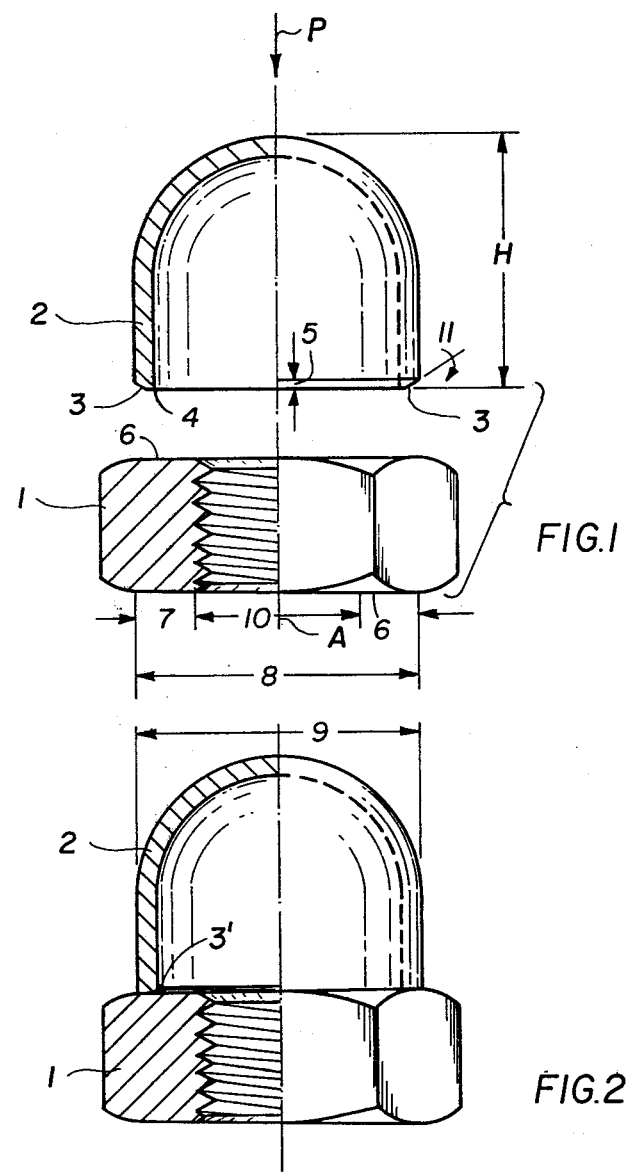
FIG. 1 illustrates a standard nut and a cup deep drawn from sheet metal stock in accordance with the present teaching.
FIG. 2 illustrates the cup and nut welded to each other.

Referring to FIG. 1 a standard hexagonal nut 1 has on at least one of its faces a ring surface 6 having a ring width 7 and an outer diameter 8, as well as an inner diameter 10. According to the invention a cup nut 2 is produced from a sheet metal blank in a deep drawing or punching step. For example, the blank may be placed in a female die cavity and a male punch is used to force the blank into the female die cavity, whereby automatically an outwardly facing chamfer 3 is formed around the lower edge 4 of the cup 2 surrounding the open end of the cup 2. The automatic formation of the chamfer or bevel 3 is presumably due to the fact that the distance from one point on the edge of the cup 2 around its outer surface and through the central axis A to the respective opposite point on the edge of the cup is larger than the corresponding distance along the inner surface of the cup. This longer distance apparently causes a larger stretching in the material layers adjacent to the other surface so that the chamfer 3 is formed automatically.

It has been found that the automatic formation of the chamfer 3 is rather advantageous because it obviates an extra machining step for the formation of such a chamfer. The edge 4 may be rather sharp or somewhat blunt, as long as the chamfer 3 has a sufficient height 5 to provide the material necessary for the formation of the weld seam 3, shown in FIG. 2. The overall height H of the cup 2 and the height 5 of the chamfer is selected in such a manner that after the completion of the welding there will remain inside the cup the desired clearance for the threaded end of a bolt. In this connection, it has been found to be satisfactory if the angle 11 formed between the plane defined by the open end of the cup 2 and the chamfer 3 is within the range of about 2° to 20°.

The cup 2 has an outer diameter 9 corresponding to the outer diameter 8 of the facing surface 6. Further, the cup 2 has an inner diameter which is at least somewhat larger than the inner diameter 10 of the ring shaped facing surface 6. This feature has the advantage that there is sufficient space for clearance inside the cup nut to accommodate the inwardly facing welding seam 3' as shown in FIG. 2, whereby no welding seam is visible at all along the juncture between the nut 1 and the cup 2 on the outside thereof. This feature also assures that the material flowing inwardly during the welding operation will not ruin the threading of the nut 1.

According to the invention, the nut 1 and cup 2 are joined to each other by axially aligning the two along the central axis A and applying pressure in the direction of the arrow P. The pressure may be applied directly through the welding electrodes. However, the welding current is switched on only after the necessary axial pressure has been applied and the welding current is again switched off before the axial pressure is removed. In this manner an inwardly flowing weld seam made up of the material adjacent to the chamfer 3 is formed, which is not visible on the outside at all and whereby any finishing machining step has been obviated.

As mentioned, the initial height H of the cup and the height 5 of the chamfer as well as its angle 11 are selected so that the intended final height of the cup above the face of the nut is assured even though the material adjacent to the chamfer is used up to form the welding seam. Thus, due to the pressure applied during the welding and slightly thereafter, the total height of the cup will be reduced to the final desired height and the initial excess height is removed by the formation of the welding seam.

It has been found that the inner butt welding seam 3' provides sufficient strength of the finished product in comparison with prior art cup nuts produced from hexagonal stock, as integral units, since the present cup nuts have substantially the same strength relative to dynamic loads.

After aligning the cup and nut axially relative to each other and after applying pressure to the aligned parts, which may be at room temperature immediately prior to the welding, welding current is supplied for a duration of about 0.04 to about 0.1 seconds, depending on the thickness of the material and the welding current employed. The application of pressure prior to and slightly after the flow of the welding current may range from about 0.01 to about 0.15 seconds or more, whereby the lower end of this range will apply to the duration prior to the flow of the welding current, whereas the upper end of the range will apply to the maintaining of the pressure subsequent to the flow of the welding current. A typical force for exerting the welding pressure for a nut of the M-10 type having a thread diameter of 10 mm would be about 300 kg, whereby a welding energy of about 50 kVA is applied for about 0.1 second. Thus, the welding pressure and the welding duration may be adjusted relative to each other, which means that the welding duration may be shorter with larger pressures and vice versa.

Although the invention has been described with reference to specific example embodiments, it is to be understood, that it is intended to cover all modifications and equivalents within the scope of the appended claims.

What is claimed is:

1. In a mass production process for welding metal parts of a cup nut together by means of resistance welding whereby the metal parts are pressed together briefly prior, during and briefly after the application of welding current, the improvement comprising deep drawing from sheet metal in a single step a cup which has a dome and an edge around its open end providing said edge of the cup in said single deep drawing step with an outwardly facing chamfer having an inwardly rising circular ridge, then substantially axially aligning said cup with a standard nut so that the inwardly rising circular ridge of the chamfer contacts a nut face, axially pressing the nut and cup together, applying welding current while maintaining said pressing, and removing said axial pressure briefly after the termination of the welding current whereby the material of the cup adjacent to said chamfer is used to form an inwardly facing one sided butt welding seam without a visible welding seam at the juncture of the nut and the outer edge of the cup and thus a machining of the welding seam is obviated.

2. The mass production process according to claim 1, wherein said cup and nut are at room temperature immediately prior to said welding.

3. The mass production process according to claim 1, wherein said welding current is applied for a duration of 0.04 to 0.1 seconds and wherein the application of pressure slightly precedes and exceeds said duration by about 0.01 to 0.05 seconds.

4. The mass production process according to claim 1, comprising selecting the axial height of the chamfer so as to provide material just sufficient to form said butt weld seam facing inwardly.

5. The mass production process according to claim 1, comprising providing said nut face with a circular flat ring surface having given inner and outer diameters and providing said deep drawn cup with an outer diameter equal to said given outer diameter of the ring surface of the nut, and further providing said deep drawn cup with an inner diameter larger than the inner diameter of said ring surface to provide a space at least sufficient for said inwardly facing butt weld seam.

6. The mass production process according to claim 1, wherein said deep drawing of the sheet metal cup produces said outwardly facing chamfer with an outwardly opening angle against the plane of the cup opening which angle ranges from about 2° to about 20°.

7. A welded cup nut when produced according to the process of claim 1.

* * * * *